United States Patent

[11] 3,566,867

| [72] | Inventor | Gale E. Dryden<br>Indianapolis, Ind. |
|---|---|---|
| [21] | Appl. No. | 684,005 |
| [22] | Filed | Nov. 17, 1967 |
| [45] | Patented | Mar. 2, 1971 |
| [73] | Assignee | Dryden Corporation<br>Indianapolis, Ind. |

[54] UNITARY DISPOSABLE CIRCLE ABSORPTION CANNISTER ASSEMBLY
2 Claims, 4 Drawing Figs.

[52] U.S. Cl. ................................................ 128/188,
    137/525
[51] Int. Cl. ............................................ A63m 17/00
[50] Field of Search ........................................ 128/188,
    191; 128/142, 142.2, 142.3, 143.6

[56] References Cited
UNITED STATES PATENTS

| 2,456,130 | 12/1948 | Lambertsen .................. | 128/142.2 |
| 2,837,413 | 6/1958 | Hay ............................. | 128/191X |
| 2,931,357 | 4/1960 | Arborelius et al. ........... | 128/191 |
| 3,240,567 | 3/1966 | Caparreli et al. ............. | 128/188X |

Primary Examiner—Anton O. Oechsle
Assistant Examiner—Paul E. Shapiro
Attorney—Woodard, Weikart, Emhardt and Naughton ABSTRACT: A circle absorption system for anesthesia including a gas machine, a carbon dioxide absorbing cannister assembly with corrugated inner wall surface, a gas supply hose thereto, rebreathing hoses and a mask connected thereto, a manometer and pressure relief valve connected thereto, an absorbing medium therein, and one-way valves mounted therein, the cannister assembly with absorbing medium and valves being disposable.

PATENTED MAR 2 1971　　　　3,566,867

INVENTOR
GALE E. DRYDEN
BY
Woodard, Weikart,
Emhardt & Naughton
ATTORNEYS

UNITARY DISPOSABLE CIRCLE ABSORPTION CANNISTER ASSEMBLY

BACKGROUND OF THE INVENTION

1. Field of the Invention

This invention relates generally to anesthesia apparatus and more particularly to features thereof facilitating sterile technique in anesthesia.

2. Description of the Prior Art

In anesthesia, it is important to be able to sterilize equipment between a case involving one patient, and the next case involving another patient. Some of the equipment presently used with circle absorber systems can be adequately sterilized by use of an autoclave or some other sterilizing apparatus, or both. However, it is usually impossible to adequately sterilize the canister components. Although there are replacable packs of absorbent material insertable in conventional canisters, the rest of the canister components are typically made of a heavy metal structure permanently mounted to the anesthesia machine and costing between $250.000 and $300.00, so not readily expendable. Moreover, they are not readily sterilized.

The present invention overcomes this disadvantage of typical prior art by providing a low-cost disposable assembly.

SUMMARY

Described briefly, in a typical embodiment of the present invention, a disposable canister assembly includes upper and lower chambers with an intermediate chamber therebetween containing absorbent material for carbon dioxide. A one-way valve is mounted in the upper chamber, being received in a fitting mounted in the wall thereof and to which a rebreathing hose is mounted. Similarly, a one-way valve is mounted in a fitting in the lower chamber to which a T-fitting is mounted, with the other rebreathing hose and the rebreathing bag mountable thereto. Three small fittings are provided in the upper chamber for reception of hoses to a manometer, a pressure relief valve, and the gas machine. The entire canister assembly is disposable.

BRIEF DESCRIPTION OF THE DRAWING

The full nature of the invention will be understood from the accompanying drawings and the following description and claims:

DESCRIPTION OF THE PREFERRED EMBODIMENT

Figure 1:
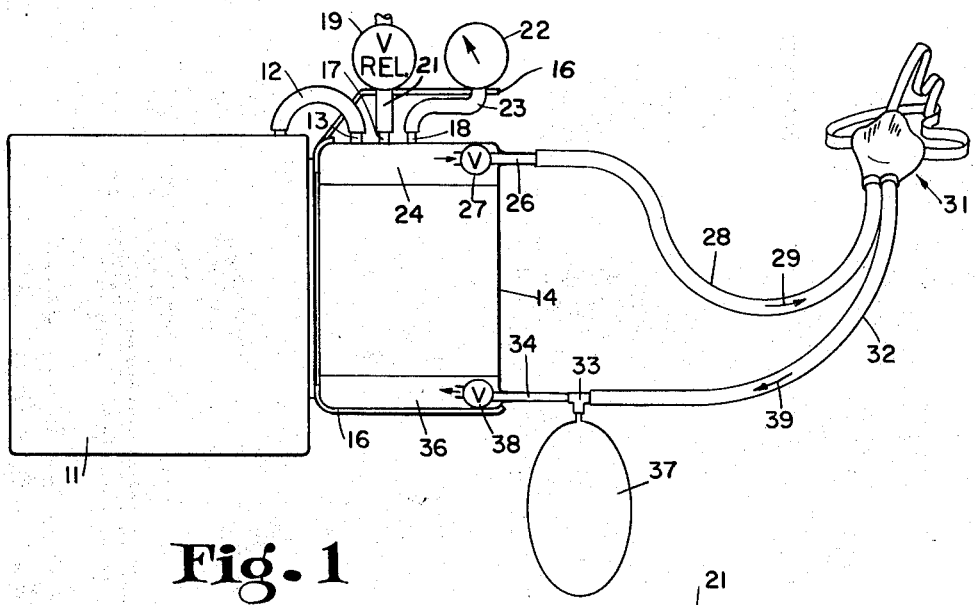
FIG. 1 is a schematic diagram of a circle absorption system incorporating one embodiment of the present invention therein.

Referring now to the drawing in detail, and more particularly to FIG. 1, the anesthesia machine (sometimes referred to as "gas" machine) is shown on a much reduced scale at 11. It is of conventional construction and provides a desirable mixture of anesthetic gases through the hose 12 to a fitting 13 integrally mounted in the case 14 of the canister assembly of the present invention. The canister assembly is removably supported on the gas machine by a steel bracket 16 shown schematically and mounted permanently to the gas machine. Two other hollow tubular stems 17 and 18 are mounted to the case 14 like stem 13. A pressure relief valve 19 is mounted by suitable hose 21 to the stem 17 and a manometer 22 is mounted by a suitable hose 23 to the stem 18. The manometer and pressure relief valve may be affixed permanently to the steel bracket 16 so that the canister can be removed without disturbing them, by simply disconnecting the hoses 21 and 23. These hoses can be discarded after one case or can be conveniently sterilized.

As shown schematically, the three stems 13, 17 and 18 communicate with an upper chamber 24 in the canister assembly having an outlet fitting 26 with a one-way valve 27 mounted therein to permit flow through rebreathing hose 28 in the direction of arrow 29 only. The face mask is provided at 31 and the other rebreathing hose 32 extends therefrom to a T-fitting 33 which is mounted to another fitting 34 similar to fitting 26 and mounted integrally with the canister wall 14 and communicating with a lower chamber 36 therein. A rebreathing bag 37 is connected to the T-fitting 33. A one-way valve 38 according to the present invention is mounted in fitting 34 and oriented to permit flow in the rebreathing tube 32 in the direction of arrow 39 only. As better shown in FIG. 2, conductive rubber adapters 40 are used to connect the rebreathing hoses 28 and 32 to fitting 26 and T-connector 33 respectively.

Figure 2:
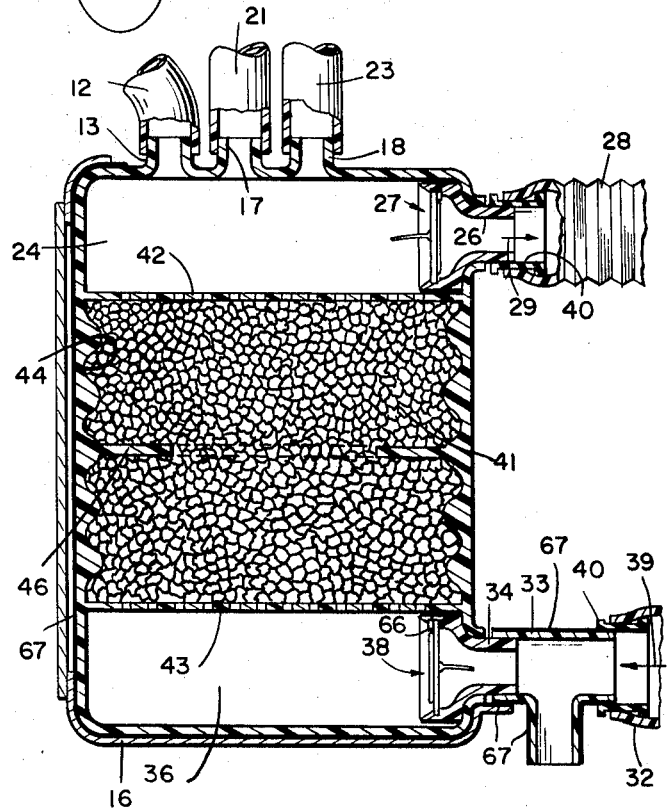
FIG. 2 is an enlarged cross section through the disposable canister assembly of FIG. 1.

Referring further to FIG. 2, an additional chamber 41 with a carbon dioxide absorbent material therein is disposed between the chambers 24 and 36. An example of the material is barium hydroxide lime in pellet form. It is confined between two bulkheads 42 and 43, appropriately apertured to allow passage of gas therethrough. The internal wall of the canister case is uneven as shown, with some of the pellets or granules of the absorbent material received in the circular grooves as shown at 44, for example. This is intended to encourage uniformity of gas flow up through the absorbent material across the entire diameter of the case from wall to wall thereof, and discourage more rapid gas flow at the wall. An inwardly projecting shelf or flange 46 is also provided for this purpose.

Figure 3:
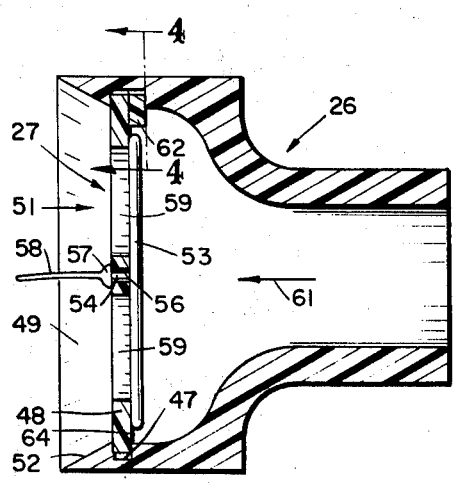
FIG. 3 is a further enlarged cross section through a one-way valve assembly component of the canister assembly according to the typical embodiment.
Figure 4:
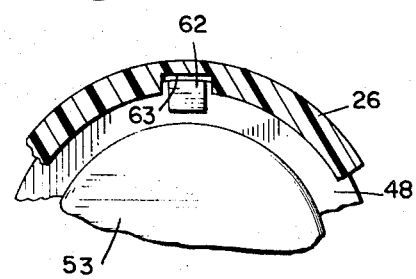
FIG. 4 is a fragmentary section taken at line 4—4 in FIG. 3 and viewed in the direction of the arrows and illustrating means for preventing inadvertent erroneous mounting of a one-way valve.

Referring now to FIGS. 3 and 4, additional details of the valve assembly 27 are illustrated. The valve body or fitting 26 has annular internal groove 47 therein receiving valve seat disc 48 which is pushed into the groove by pushing it through the opening 49 in the direction of the arrow 51. As it enters the tapered entry surface 52, the valve disc expands it sufficiently for the valve disc to snap over the edges into the groove 47. This disc has a typical umbrella valve member 53 mounted thereon and which is normally made of a rubber material extending over the face of the disc and having an integral stem 54 received through a central aperture 56 in the disc. The stem has a knob 57 therein to retain the flat sealing portion on the disc after the stem is pulled through the central opening 56 by means of the tab 58. Such valve construction is well known and the umbrella flap normally closes apertures 59 through the disc to prevent flow in the direction of the arrow 61, but accommodate flow in the direction of the arrow 51. Because this particular valve assembly is intended to permit flow in the system in the direction of the arrow 29 (FIGS. 1 and 2) there must be certainty that it is installed properly.

To be sure that the disc is properly oriented in the fitting 26, a lug 62 is provided thereon extending axially therefrom and received in a pocket 63 projecting axially from the shoulder 64 of the fitting 26. Consequently the disc can be installed only when the lug 62 is in registry with the cavity or recess 63.

Because the disc in valve 38 must be installed so that the flow therethrough is in the opposite direction to that in valve 27, the recess or notch in the groove of the corresponding fitting 34 is located to the left-hand side of the disc as at 66. Therefore the disc cannot be mounted in the direction shown in FIG. 3, so there is no chance of error.

As is well known, it is extremely undesirable and indeed hazardous to tolerate accumulations of static electricity in apparatus for anesthesia. Therefore, in addition to using conductive rubber at appropriate places, such as the adapters 40, for example, conductive strips are provided on various components as indicated schematically at 67. Although the thickness thereof is shown in exaggerated form on the drawings, it can be virtually negligible, conductive paints or deposits being suitable for this purpose. Such conductive strips are desirable because the case, the bulkheads, the stems and fittings used are all of a plastic material in the disposable assembly. After use of the assembly with one patient has been completed, the entire unit, from the stems communicating with the upper chamber, to the bottom of the lower chamber, and including the fittings 26 and 34 integral with the canister assembly, and the valves therein, are to be thrown away as a unit. In fact, they are preferably inseparable from each other without destruction of the assembly.

In FIG. 2 there is shown schematically a steel bracket 16 by means of which the canister assembly can be mounted to a gas machine. A variety of such brackets might be employed, so long as they have in common the feature of facilitating installation and removal of the canister assembly therefrom and the ability to provide an electrical ground connection to the gas machine.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

I claim:

1. In a circle absorption system, the combination comprising:
   a disposable case having first, second, and third chambers therein;
   an inlet fitting in said case communicating with said first chamber;
   an outlet fitting in said case communicating with said third chamber;
   said first chamber communicating with said third chamber through said second chamber;
   an absorbent material for carbon dioxide, disposed in said second chamber;
   a plurality of additional fittings in said case communicating with said chambers;
   flow direction control valves in said inlet and outlet fittings;
   an anesthesia machine with a mounting bracket secured thereto and having pressure-measuring and pressure-relief means mounted thereon; and
   said case being received on said mounting bracket and said additional fittings being coupled to said measuring and relief means, said case being removable from said bracket and said measuring and relief means and disposable as a unit.

2. In a circle absorption system, the combination comprising:
   a disposable case having first, second, and third chambers therein;
   an inlet fitting in said case communicating with said first chamber;
   an outlet fitting in said case communicating with said third chamber;
   said first chamber communicating with said third chamber through said second chamber;
   an absorbent material for carbon dioxide, disposed in said second chamber;
   a plurality of additional fittings in said case communicating with said chambers;
   flow direction control valves in said inlet and outlet fittings;
   said second chamber being cylindrical;
   the cylindrical surface of said case which faces said second chamber being uneven around the circumference thereof, with said material in close contact therewith and encouraging uniform flow of gas up through said material, across the diameter of said second chamber; and
   said surface having a vertically extending series of circular grooves therein and a circular flange extending radially inward therefrom.